Figure 1:
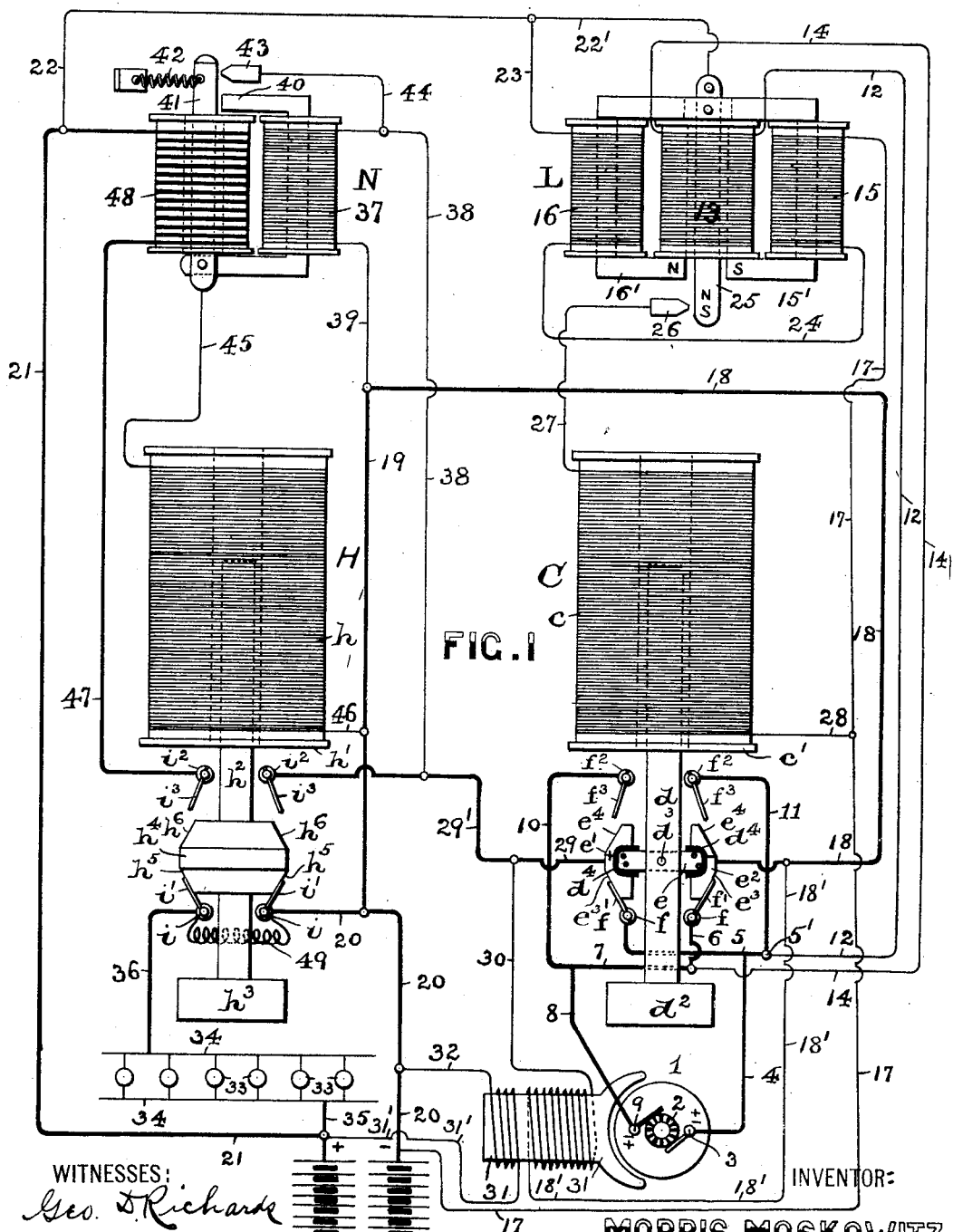

No. 665,541. Patented Jan. 8, 1901.
M. MOSKOWITZ.
ELECTRIC LIGHTING SYSTEM.
(Application filed Apr. 13, 1900.)
(No Model.) 2 Sheets—Sheet 1.

WITNESSES: Geo. D. Richards, Marcy F. Truesdell

INVENTOR: MORRIS MOSKOWITZ
BY Fred C. Fraentzel, ATTORNEY

THE NORRIS PETERS CO., PHOTO-LITHO., WASHINGTON, D. C.

No. 665,541. Patented Jan. 8, 1901.
M. MOSKOWITZ.
ELECTRIC LIGHTING SYSTEM.
(Application filed Apr. 13, 1900.)
(No Model.) 2 Sheets—Sheet 2.
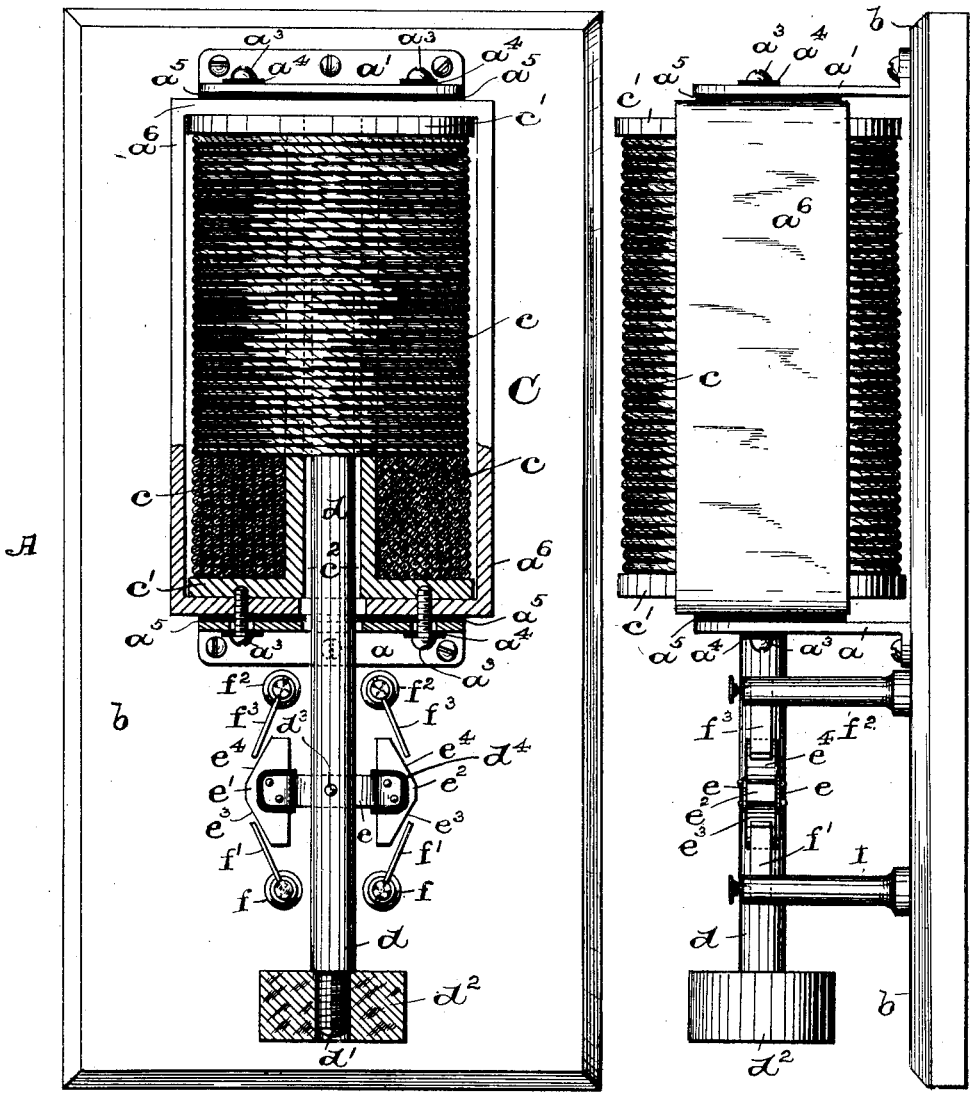
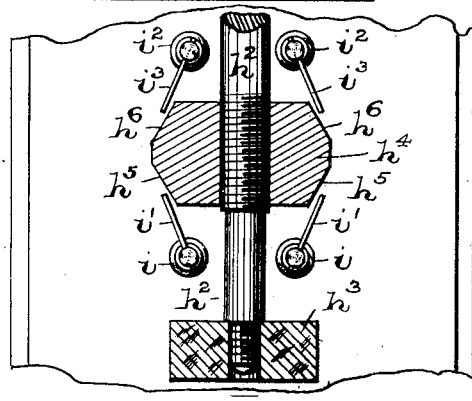
FIG. 2.
FIG. 3.
FIG. 4.
WITNESSES:
Geo. D. Richards
Marcy Z. Truskell
INVENTOR:
MORRIS MOSKOWITZ
BY
Fred L. Fraentzel
ATTORNEY

UNITED STATES PATENT OFFICE.

MORRIS MOSKOWITZ, OF NEW YORK, N. Y.

ELECTRIC-LIGHTING SYSTEM.

SPECIFICATION forming part of Letters Patent No. 665,541, dated January 8, 1901.

Application filed April 13, 1900. Serial No. 12,684. (No model.)

*To all whom it may concern:*

Be it known that I, MORRIS MOSKOWITZ, a citizen of the United States, residing at New York, in the county of New York and State of New York, have invented certain new and useful Improvements in Electric-Lighting Systems; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to a novel system of generating and distributing electricity to be used more especially for heating or lighting railway or other cars by the generated electric current; and, furthermore, the invention has reference to a novel construction of pole-changer the magnetic core of which acts or works in one vertical direction by gravity and in the opposite vertical direction by the magnetism generated by an electric current passed through the solenoid of the device.

In an electric-lighting system in which the source of power for driving the dynamo is one of the car-wheel axles it is a well-known fact that the electric generator must be able to work in both directions of armature rotation, according to the direction of travel of the car or train of cars. Furthermore, there must also be an automatically-operating make-and-break switch which will close the circuit between the dynamo and the receiving-battery when the generating-machine or dynamo has an electromotive force somewhat higher than that of the battery, but said switch also operating automatically to open such circuit between the generator and the battery when the electromotive force of the generator falls below that of the battery, and thereby cause a constant maintenance of the electromotive force of the dynamo irrespective of its variable armature speed.

The principal object of this invention, therefore, is to provide a simple, complete, and effectively-operating system having a dynamo or other electric generator operated from a car-wheel axle and the electric output thereof controlled and maintained constant irrespective of the variable axle speed.

A further object of this invention is to provide a novel construction of pole-changer acting automatically to change the polarity of the electric generator or dynamo according to the direction of rotation of its armature, which corresponds to the direction of rotation of the car-wheel axle from which the generator is driven.

My present invention therefore consists in the novel arrangement of the electrical apparatus and circuits to be hereinafter fully set forth, as well as in the novel arrangement and construction of a pole-changer employed in connection with my present invention, all of which will be fully described in the accompanying specification and then finally embodied in the clauses of the claim.

The invention is clearly illustrated in the accompanying sheet of drawings, in which—

Figure 1 is a diagrammatic view illustrating the embodiment of my invention and clearly representing one arrangement of all the electrical circuits and apparatus therein. Fig. 2 is a front view of my novel construction of pole-changer, the solenoid thereof being represented partly in elevation and partly in vertical section; and Fig. 3 is a side view of the said pole-changer. Fig. 4 is a detail view of portions of the make-and-break switch employed in my present invention.

Similar letters and numerals of reference are employed in all of the said above-described views to indicate corresponding parts.

Before describing the arrangement of the electric circuits and the apparatus therein I will first describe the construction and operation of the pole-changer. (Represented more particularly in Figs. 2 and 3 of the drawings.) In said figures, A indicates the complete device, which is suitably secured upon a base or frame $b$ by means of brackets or supports $a$ and $a'$. Secured between said brackets or supports, preferably by means of screws $a^3$, which are insulated by the parts $a^4$ and $a^5$, is a yoke or frame $a^6$, of iron, which is a good magnetic conductor. Between the ends of said yoke and suitably held in place by the supports or brackets $a$ and $a'$ is a solenoid C, which consists of the spool $c'$, upon which is wound the wire coil $c$. Within the tubular portion $c^2$ of said spool $c'$ is movably arranged the upper part of a plunger $d$. Said plunger has secured upon its lower end in any desirable manner, preferably by being secured upon a screw portion $d'$, a suitable weight $d^2$; but of course it will be understood that said weight may form an integral part of the plunger $d$. The said plunger $d$ has secured in a slotted portion, preferably by means of a pin $d^3$, an arm $e$, which is provided at its opposite ends with contact-making shoes $e'$ and $e^2$. These shoes, which are insulated from each other at $d^4$, have the contact-making surfaces $e^3$ and $e^4$, said surface $e^3$ being capable of electric contact with a pair of spring-contacts $f'$, connected with the posts $f$ on the base $b$, when there is no current passing through the solenoid-coil, and the plunger moves in a vertical and downward direction by the action of its own weight and that of the weight $d^2$ connected therewith. In like manner the contact-making surfaces $e^4$ of the contact-making shoes $e'$ and $e^2$ are capable of making electric contact with another pair of spring-contacts $f^3$, connected with the posts $f^2$ on the base $b$, when an electric current passes through the solenoid-coil in the manner and for the purposes hereinafter more fully set forth.

The make-and-break switch, which also forms an essential part of this invention, is indicated by the reference-letter H. This device is provided with a spool $h'$ and a solenoid-coil $h$, similar in arrangement and construction to that of the solenoid C, and $h^2$ is the plunger of said device H. This plunger is likewise provided at its lower end with a weight $h^3$ and has a contact-making shoe $h^4$, which is provided with the contact-making surfaces $h^5$ and $h^6$. The surface $h^5$ of the shoe $h^4$ is capable of electric contact with a pair of spring-contacts $i'$, connected with suitable posts $i$, when the plunger $h^2$ acts vertically by gravity; but when the plunger $h^2$ becomes magnetized then the surface $h^6$ will make electrical contact with a pair of spring-contacts $i^3$, connected with suitable posts $i^2$, substantially in the manner and for the purposes hereinafter more fully set forth.

Assume that all the several devices and circuits have been properly connected and that the train is running in such a direction that the armature 2 of the dynamo 1 will develop electric current which is positive at the brush-terminal 3 of the dynamo. The current then passes through a circuit-wire 4, which is connected with a circuit-wire 5 and with one of the posts $f'$ of the pole-changer. Since there is no current passing at this time into and through the solenoid-coil $c$, the plunger $d$ by its own gravity and that of the weight $d^2$ causes the contact-surfaces $e^3$ of the shoe $e$ to contact with the spring-contacts $f'$. The electric current thus passes from wire 5 into the shoe $e'$ and thence into and through the translating devices, (hereinafter more fully described,) returning to the contact-making shoe $e^2$, and thence back through the spring-contact $f'$ and its post through the circuit-wires 6, 7, and 8 to the negative brush-terminal 9 of the dynamo. Now assuming that the armature 2 of the dynamo 1 is caused to rotate in the opposite direction, due to the change in the direction of travel of the car, then the brush-terminal 9 of the dynamo becomes positive and the brush-terminal 3 becomes negative, as is clearly evident. The generated current will now pass into and through wire 8 and wire 10, connected with post $f^2$. The plunger $d$ now having been drawn farther into the solenoid-coil $c$, in the manner hereinafter more fully explained, an electrical contact is established through the shoe $e'$, the current passing through the several translating devices and returning through the other shoe $e^2$ of the contact-making device and through the spring-contact $f^3$ and wire 11 into a portion of wire 5, back through wire 4 into the negative armature brush-terminal 3. Thus it will be seen that no matter in which direction the armature rotation may be, which of course changes the polarity of the brush-terminals and the direction of the flow of current from the dynamo, the result of the workings of the pole-changer C is that the flow of the electric current will be rectified under these varying conditions, the shoe $e'$, which is insulated from the shoe $e^2$, as hereinabove stated, always being positive and the shoe $e^2$ always being negative.

The magnetic coil $c$ of the solenoid is energized in the following manner: Connected with the armature-terminal 3 of the dynamo, the wire 4, and wire 5 at $5'$ is a circuit wire 12, which is connected with the center coil 13 of a three-coil relay L, said coil 13 being connected by a wire 14 with the circuit-wires 7 and 8, and thereby with the opposite armature-terminal 9. It will thus be seen that this coil 13 is subject to current reversal according to the direction of the armature rotation of the dynamo, since said coil 13 is in a direct circuit with the brush-terminals of the dynamo. The said three-coil relay L has a pair of magnetic coils 15 and 16, both of which are energized directly from the battery M. They are in circuit with said battery by means of the wires 17 and 20, which lead from the coil 15 to the battery M, and the wires 21 22 23, which lead from the battery to the coil 16, both coils 15 and 16 being connected in series by a wire 24. The respective pole-pieces $16'$ and $15'$ of said coils 16 and 15 will therefore always have a permanent polarity, the former pole-piece $16'$ always being "N" and the latter pole-piece $15'$ always being "S." The said coil 13 of the three-coil relay L has an armature 25, which is pivoted at the top, so as to be capable of being attracted by either pole-piece $16'$ or $15'$. From an inspection of Fig. 1 it will be seen that when the flow of the electric current is from the armature-terminal 3 of the dynamo then the flow of the current through the coil will be in the direction coming from the wire 12 and going out at wire 14 and the swing-armature 25 will be attracted by the pole-piece 15' of the coil 15. The coil $c$ of the pole-changer is consequently cut out of circuit with the battery, and the contact-shoes $e'$ and $e^2$ will make proper contact with the spring-contacts $f'$ by the direct downward and vertical motion of the plunger $d$ by its own gravity. When, however, the flow of the electric current is from the armature-terminal 9 of the dynamo, then its flow through coil 13 will be in a direction opposite from that just set forth—that is, the current will come in from wire 14 and go out into wire 12. This direction of the flow of current through the coil 13 will cause the end of the swing-armature to be of opposite polarity from that previously set forth. This armature 25 is thereby attracted by the pole-piece 16' and makes contact with a contact-piece 26 and completes an electric circuit through wires 27 and 28 and the coil $c$. The plunger $d$ now becomes magnetized and is drawn farther into the spool $c'$, whereby the shoes $e'$ and $e^2$ break contact with the spring-contacts $f'$ and establish electrical contact with the spring-contacts $f^3$. Having shown that this three-coil relay L is directly responsible for the proper movement of the contact shoes $e'$ and $e^2$, so that contact-shoe $e'$ will always be positive and contact-shoe $e^2$ always negative, irrespective of the direction of the armature rotation, I will now proceed with the description of the remaining circuits, which are connected with the permanently-rectified contact-shoes $e'$ and $e^2$.

Starting out from the positive shoe $e'$, the current passes through wires 29 30, through the generator-field 31, and back through wires 18' and 18 to the negative contact-shoe $e^2$. This insures at all times the current flowing in one and the same and the proper direction through the field 31 of the dynamo no matter in which direction the armature of the dynamo may be rotating. The field of the generator thereby becomes completely built up, and as the speed of the car-axle increases—say at about fifteen miles per hour—then the electromotive force of the dynamo exceeds that of the battery. The generator-field 31 has also a fine shunt-winding connected directly in circuit by wires 31' and 32 and 20 with battery M for the purpose of replacing the residual magnetism in the field. This is a very fine winding, whereby but a fraction of a current is consumed. The lamps 33 in the lamp-circuit 34 are all fed from the battery M through circuit-wires 35 36, the spring contact-plates $i'$, and the contact-shoe $h^4$, which was operated by its own gravity, the circuit being completed by wire 20.

It now becomes essential to automatically actuate the make-and-break switch H by causing the shoe $h^4$ to make contact with the spring contact-plates $i^3$ in order that the generator $l$ may charge the battery M as well as feed the lamps. This is accomplished in the following manner: N indicates a two-coil relay having a shunt spool or coil 37. This coil is connected in circuit with the positive contact-shoe $e'$ by the wires 29, 29', and 38 with the coil and then by the wires 39 and 18 with the negative contact-shoe $e^2$. The current from the dynamo thus passing through said coil 37 energizes its pole-piece 40 to a certain magnetic strength. This causes the attraction of a swinging armature 41 against the action of a tension-spring 42. As soon as mechanical contact is made between the piece 40 and the armature 41 electrical contact is completed between said armature 41 and a contact-piece 43. A complete circuit is established from the positive contact-shoe $e'$ through the wires 29 29', 38 44, the contact-piece 43, armature 41, wire 45, and coil $h$ of the make-and-break switch H. After energizing this coil $h$ the current returns through wires 46 19 18 to the negative contact-shoe $e^2$. An electric circuit thus having been established through the coil $h$, the plunger $h^2$ is magnetized and moves in an upward direction, causing the shoe $h^4$ to make electrical contact with the spring contact-plates $i^3$. A complete circuit is consequently established for charging the battery and feeding the lamps. The current now passes from the positive contact-shoe $e'$ through wires 29 29' into the contact-plate $i^3$ and the shoe $h^4$ into the opposite spring contact-plate $i^3$, and thence into wire 47, the relay-coil 48, and wire 21 into the battery M. The return-path from the battery M is through wires 20 19 18 to the negative contact-shoe $e^2$. As long as the electromotive force of the dynamo is above that of the battery the effect of the current passing through the coil 48 is that it energizes the swinging armature 41 to such a polarity that it will be attracted to the pole-piece 40 and the completion of the circuit through the coil $h$ will be maintained. At the same time the completed circuit through the spring-contacts $i^3$ and the shoe $h^4$ will be fully maintained. When, however, the voltage of the generator decreases to such an extent that it equals the counter electromotive force of the battery due to the slowing down of the train, then momentarily there will be no current passing between the generator and the battery. Should the voltage of the generator drop still a fraction lower, then the battery will attempt to reverse its current and in so doing the polarity of the swinging armature 41 of the coil 48 will become suddenly reversed, repelling itself from the pole-piece 40 of the coil 37 on account of both poles of the pieces 41 and 40 being alike. The circuit between the armature 41 and the contact-piece 43 also becomes broken and the solenoid-coil $h$ is rendered inactive. The plunger $h^2$ drops by its own gravity and the circuit between the part $h^4$ and the plates $i^3$ is broken. The electric generator $l$ is therefore entirely cut out of circuit with the battery and lamps, the latter now being fed from the battery alone, the circuit being through the spring-contacts $i'$ and the shoe $h^4$. Between said spring-contacts $i'$ I have arranged a suitable resistance 49. The employment of this resistance is desirable and of importance, for while the generator is charging the battery this resistance thus placed in the lamp-circuit will cut down the higher electromotive force of the generator necessary to charge the battery. When the generator is charging the battery M, contact is broken between the spring-arms $i'$ and the part or shoe $h^4$, as hereinabove stated, and the path of the electric current to the lamp-circuit is directly through this resistance 49, whereby the voltage is cut down sufficiently to not burn out the lamps and render them inoperative. On the other hand, when the lamps are fed directly from the battery M then this resistance must not remain in the lamp-circuit, for this would bring the voltage of each lamp below its required candle-power. The switch-shoe $h^4$ being a good conductor thus assures the easiest path for the current from the battery through wire 20, spring-contacts $i'$, and wire 36 to the lamp-circuit and the lamps therein, as will be clearly evident.

Of course it will be understood that changes may be made in the various details and arrangements and combinations of the circuits and the electric devices without departing from the scope of my present invention. Hence I do not limit my invention to the exact arrangements and combinations of the several devices and parts herein described, and illustrated in the accompanying drawings. It will also be understood that my invention is applicable not only to the generation of electricity from the car-wheel axle, but it is also of use where a dynamo is driven from other sources of variable speed or where the armature is subject to reversal.

Having thus described my invention, what I claim is—

1. In an electric-lighting system, the combination, with a main circuit containing lamps or other translating devices, of a dynamo or other electric generator subject to reversal of armature rotation, and an automatic pole-changing device in circuit with the brush-terminals of said dynamo or generator, comprising a solenoid-coil, a plunger extending into said coil, and movable upwardly therein by magnetism when said solenoid-coil is energized, but movable downwardly by gravity when said solenoid-coil is out of circuit, and contact devices connected with said plunger, said contact devices being of constant polarity, and arranged in circuit with the main circuit, substantially as and for the purposes set forth.

2. In an electric-lighting system, the combination, with a main circuit containing lamps or other translating devices, of a dynamo or other electric generator subject to reversal of armature rotation, and an automatic pole-changing device in circuit with the brush-terminals of said dynamo or generator, comprising a solenoid-coil, a plunger extending into said coil, and movable upwardly therein by magnetism when said solenoid-coil is energized, but movable downwardly by gravity when said solenoid-coil is out of circuit, a pair of spring-contacts $f'$ and a pair of spring-contacts $f^3$, both pairs of spring-contacts being connected with the dynamo-circuit extending from the brush-terminals, a pair of insulated contact-shoes connected with said plunger, adapted by the respective movements of the plunger to make or break contact with the respective spring-contacts, whereby said shoes are of constant polarity, and said shoes being arranged in circuit with the main circuit, substantially as and for the purposes set forth.

3. In an electric-lighting system, the combination, with a main circuit, and a battery in said circuit, of a dynamo or other electric generator subject to reversal of armature rotation, a relay in circuit with said battery, and an automatic pole-changing device in circuit with the brush-terminals of said dynamo or generator, comprising a solenoid-coil in circuit with said relay, a plunger extending into said coil, and movable upwardly therein by magnetism when said solenoid-coil is energized from said relay, but movable downwardly by gravity when said solenoid-coil is thrown out of circuit by the action of said relay, and contact devices connected with said plunger, said contact devices being of constant polarity, and arranged in circuit with the main circuit, substantially as and for the purposes set forth.

4. In an electric-lighting system, the combination, with a main circuit, and a battery in said circuit, of a dynamo or other electric generator subject to reversal of armature rotation, a relay in circuit with said battery, and an automatic pole-changing device in circuit with the brush-terminals of said dynamo or generator, comprising a solenoid-coil in circuit with said relay, a plunger extending into said coil, and movable upwardly therein by magnetism when said solenoid-coil is energized from said relay, but movable downwardly by gravity when said solenoid-coil is thrown out of circuit by the action of said relay, a pair of spring-contacts $f'$ and a pair of spring-contacts $f^3$, both pairs of spring-contacts being connected with the dynamo-circuit extending from the brush-terminals, a pair of insulated contact-shoes connected with said plunger, adapted by the respective movements of the plunger to make or break contact with the respective spring-contacts, whereby said shoes are of constant polarity, and said shoes being arranged in circuit with the main circuit, substantially as and for the purposes set forth.

5. In an electric-lighting system, the combination, with a main circuit, containing lamps or other translating devices, a battery in said circuit, of a dynamo or other electric generator, having its field in circuit with said main circuit, and the dynamo or generator being subject to reversal of armature rotation, an automatic pole-changing device in circuit with the brush-terminals of said dynamo or generator, a pair of insulated contact devices connected with said pole-changing device, said contact devices being of constant polarity, and arranged in circuit with the main circuit, and an automatically-operating make-and-break switch, having a contact-shoe movable vertically by gravity for throwing the lamp-circuit in direct circuit with the battery, and said contact-shoe moving upwardly by magnetism, to establish a complete circuit through the dynamo-field, the main circuit and battery or the lamps in the lighting-circuit, substantially as and for the purposes set forth.

6. In an electric-lighting system, the combination, with a main circuit, containing lamps or other translating devices, a battery in said circuit, of a dynamo or other electric generator, having its field in circuit with said main circuit, and the dynamo or generator being subject to reversal of armature rotation, an automatic pole-changing device in circuit with the brush-terminals of said dynamo or generator, comprising a solenoid-coil, a plunger extending into said coil, and movable upwardly therein by magnetism when said solenoid-coil is energized, but movable downwardly by gravity when said solenoid-coil is out of circuit, and contact devices connected with said plunger, said contact devices being of constant polarity, and arranged in circuit with the main circuit, and an automatically-operating make-and-break switch, having a contact-shoe movable vertically by gravity for throwing the lamp-circuit in direct circuit with the battery, and said contact-shoe moving upwardly by magnetism to establish a complete circuit through the dynamo-field, the main circuit and battery or the lamps in the lighting-circuit, substantially as and for the purposes set forth.

7. In an electric-lighting system, the combination, with a main circuit, containing lamps or other translating devices, a battery in said circuit, of a dynamo or other electric generator, having its field in circuit with said main circuit, and the dynamo or generator being subject to reversal of armature rotation, an automatic pole-changing device in circuit with the brush-terminals of said dynamo or generator, comprising a solenoid-coil, a plunger extending into said coil, and movable upwardly therein by magnetism when said solenoid-coil is energized, but movable downwardly by gravity when said solenoid-coil is out of circuit, a pair of spring-contacts $f'$ and a pair of spring-contacts $f^3$, both pairs of spring-contacts being connected with the dynamo-circuit extending from the brush-terminals, a pair of insulated contact-shoes connected with said plunger, adapted by the respective movements of the plunger to make or break contact with the respective spring-contacts, whereby said shoes are of constant polarity, said shoes being arranged in circuit with the main circuit, and an automatically-operating make-and-break switch, having a contact-shoe movable vertically by gravity for throwing the lamp-circuit in direct circuit with the battery, and said contact-shoe moving upwardly by magnetism to establish a complete circuit through the dynamo-field, the main circuit and battery or the lamps in the lighting-circuit, substantially as and for the purposes set forth.

8. In an electric-lighting system, the combination, with a main circuit, containing lamps or other translating devices, a battery in said circuit, of a dynamo or other electric generator, having its field in circuit with said main circuit, and the dynamo or generator being subject to reversal of armature rotation, a relay in circuit with said battery, an automatic pole-changing device in circuit with the brush-terminals of said dynamo or generator, comprising a solenoid-coil in circuit with said relay, a plunger extending into said coil, movable upwardly therein by magnetism when said solenoid-coil is energized from said relay, but movable downwardly by gravity when said solenoid-coil is thrown out of circuit by the action of said relay, contact devices connected with said plunger, said contact devices being of constant polarity, a second relay in said main circuit, an automatically-operating make-and-break switch, having a solenoid-coil and a contact-shoe movable vertically by gravity for throwing the lamp-circuit in direct circuit with the battery, and said contact-shoe moving upwardly by magnetism, when the coil of said make-and-break switch is energized by said second relay, to establish a complete circuit through the dynamo-field, the main circuit and battery or the lamps in the lighting-circuit, substantially as and for the purposes set forth.

9. In an electric-lighting system, the combination, with a main circuit, containing lamps or other translating devices, a battery in said circuit, of a dynamo or other electric generator, having its field in circuit with said main circuit, and the dynamo or generator being subject to reversal of armature rotation, a relay in circuit with said battery, an automatic pole-changing device in circuit with the brush-terminals of said dynamo or generator, comprising a solenoid-coil in circuit with said relay, a plunger extending into said coil, movable upwardly therein by magnetism when said solenoid-coil is energized from said relay, but movable downwardly by gravity when said solenoid-coil is thrown out of circuit by the action of said relay, a pair of spring-contacts $f'$ and a pair of spring-contacts $f^3$, both spring-contacts being connected with the dynamo-circuit extending from the brush-terminals, a pair of insulated contact-shoes connected with said plunger, adapted by the respective movements of the plunger to make or break contact with the respective spring-contacts, whereby said shoes are of constant polarity, and said shoes being arranged in circuit with the main circuit, a second relay in said main circuit, an automatically-operating make-and-break switch having a solenoid-coil and a contact-shoe movable vertically by gravity for throwing the lamp-circuit in direct circuit with the battery, and said contact-shoe moving upwardly by magnetism, when the coil of said make-and-break switch is energized by said second relay, to establish a complete circuit through the dynamo-field, the main circuit and battery or the lamps in the lighting-circuit, substantially as and for the purposes set forth.

10. A pole-changing device, comprising a solenoid-coil, a movable-downward-by-gravity-and-upward-by-magnetism plunger, a pair of contact-shoes connected with said plunger, insulated one from the other, and a double pair of spring-contacts $f'$ and $f^3$, the downward movement by gravity, causing said contact-shoes to make electrical contact with said spring-contacts $f'$, and the upward movement by magnetism when the solenoid-coil is energized, causing said contact-shoes to make electrical contact with said spring-contacts $f^3$, substantially as and for the purposes set forth.

11. A pole-changing device, comprising a solenoid-coil, a movable-downward-by-gravity-and-upward-by-magnetism plunger, having its upper end extending into said coil, a weight at the lower end of said plunger, a pair of contact-shoes connected with the said plunger, insulated one from the other, and a double pair of spring-contacts $f'$ and $f^3$, the downward movement by gravity, causing said contact-shoes to make electrical contact with said spring-contacts $f'$, and the upward movement by magnetism when the solenoid-coil is energized, causing said contact-shoes to make electrical contact with said spring-contacts $f^3$, substantially as and for the purposes set forth.

In testimony that I claim the invention set forth above I have hereunto set my hand this 9th day of April, 1900.

MORRIS MOSKOWITZ.

Witnesses:
FREDK. C. FRAENTZEL,
GEO. D. RICHARDS.